United States Patent
Huang et al.

(10) Patent No.: US 12,182,700 B2
(45) Date of Patent: Dec. 31, 2024

(54) METHOD FOR DERIVING FAULT DIAGNOSIS RULES OF BLAST FURNACE BASED ON DEEP NEURAL NETWORK

(71) Applicant: Zhejiang University, Hangzhou (CN)

(72) Inventors: Xiaoke Huang, Hangzhou (CN); Chunjie Yang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 897 days.

(21) Appl. No.: 17/324,410

(22) Filed: May 19, 2021

(65) Prior Publication Data

US 2021/0365784 A1    Nov. 25, 2021

(30) Foreign Application Priority Data

May 19, 2020    (CN) .......................... 202010422427.6

(51) Int. Cl.
| | |
|---|---|
| *G06N 3/08* | (2023.01) |
| *C21B 7/24* | (2006.01) |
| *G06N 3/04* | (2023.01) |
| *G06N 3/063* | (2023.01) |
| *G06N 5/01* | (2023.01) |
| *G06N 5/025* | (2023.01) |

(52) U.S. Cl.
CPC ................ *G06N 3/08* (2013.01); *C21B 7/24* (2013.01); *G06N 3/04* (2013.01); *G06N 3/063* (2013.01); *G06N 5/01* (2023.01); *G06N 5/025* (2013.01)

(58) Field of Classification Search
None
See application file for complete search history.

(56) References Cited

PUBLICATIONS

Ouyang et al., Fault Detection and Identification of Blast Furnace Ironmaking Process Using the Gated Recurrent Unit Network, Processes 2020, 8, 391; doi:10.3390/pr8040391; Mar. 27, 2020; Total pp. 15 (Year: 2020).*
Lian et al., Fault diagnosis of the blast furnace based on the Bayesian network model; 2010 International Conference on Electrical and Control Engineering, IEEE, 2010; pp. 990-993 (Year: 2010).*
Wang et al., Fault Diagnosis of Blast Furnace Based on DAGSVM; 3rd International IEEE Conference Intelligent Systems, Sep. 2006; pp. 571-574 (Year: 2006).*
Wang et al., Fault Diagnosis of Blast Furnace Based on Improved Binary-Tree SVMS; World Automation Congress; 2010; Total pp. 7 (Year: 2010).*

* cited by examiner

*Primary Examiner* — Alan Chen
(74) *Attorney, Agent, or Firm* — ArentFox Schiff LLP; Michael Fainberg

(57) ABSTRACT

The present disclosure discloses a method for deriving fault diagnosis rules of a blast furnace based on a deep neural network, which relates to the field of industrial process monitoring, modeling and simulation. Firstly, a deep neural network is used to model historical fault data of the blast furnace. Then, for each kind of fault, the process starts from the output layer of the network, wherein sub-models of nodes in the adjacent layers in the deep neural network are established by using the decision tree in sequence, and the if-then rule is derived. Finally, the if-then rules are merged layer by layer, so as to finally obtain fault diagnosis rules of the blast furnace with blast furnace process variables being the rule antecedents and with fault categories being the rule consequents.

5 Claims, 3 Drawing Sheets

METHOD FOR DERIVING FAULT DIAGNOSIS RULES OF BLAST FURNACE BASED ON DEEP NEURAL NETWORK

CROSS REFERENCE TO RELATED APPLICATION(S)

This patent application claims the benefit and priority of Chinese Patent Application No. 202010422427.6, filed on May 19, 2020, the disclosure of which is incorporated by reference herein in its entirety as part of the present application.

TECHNICAL FIELD

The present disclosure relates to the field of industrial process monitoring, modeling and simulation, and particularly to a method for deriving fault diagnosis rules of a blast furnace based on a deep neural network.

BACKGROUND ART

In the iron and steel manufacturing process, the large-sized iron-making system dominated by large blast furnaces is a key process of ferrite material flow conversion. A large blast furnace is the core equipment used in iron and steel manufacturing process and the largest chemical reaction vessel in the world. During the operation of the large blast furnace, if abnormal furnace conditions cannot be monitored, diagnosed and controlled in time, it will cause not only great loss of resources and equipment which reduces the life cycle of the blast furnace, but also accidents resulting in casualties and property losses. Therefore, ensuring the safe operation of the blast furnace is of the highest priority and importance in the process of iron and steel manufacturing.

Crude fuels for most large-sized iron-making systems in China are poor in endowment and variable in composition, resulting in frequent fluctuations and slippery patterns of operating conditions. In addition, the field-phase coupling and nonlinear multi-parameter coupling of the large-sized iron-making system are extremely complex, and key parameters characterizing the operation performance are difficult to be detected on-line. Characteristics such as the dynamics, fragility, uncertainty and incomplete information of the blast furnace make the fault diagnosis of the blast furnace system a very challenging subject. In actual production, the maintaining of the blast furnace is still the operation and regulation mainly based on manual experience and knowledge. Those expert systems in the prior art successfully applied to the fault diagnosis of the blast furnace has not been taken seriously due to high costs on development and maintenance, serious performance degradation, and the like. Therefore, it is urgent to deeply integrate the iron-making expertise, operation experience and intelligent technology on the basis of automation and informatization of the iron-making production in the prior art, so as to realize deep perception of information, intelligent optimization of decision-making, precise and coordinated control, thereby improving the intelligence level of the production process of large-sized iron-making systems in China.

Fault diagnosis methods of the blast furnace in the prior art basically include the expert system method and the data-driven method, wherein the data-driven method consists of two major classes, namely the multivariate statistics and the machine learning. According to the expert system method, a rule base is established mainly by virtue of iron-making process expertise and the experience of blast furnace operators, and then a set of inference and decision-making methods are designed to diagnose the abnormal furnace conditions of the blast furnace. Establishing a rule base in this way is costly, and with the increase of blast furnace campaign over time or dramatic change of blast furnace conditions, the expert system may fail and lack the capability of enhancing the evolution. According to the method of machine learning, the traditional white-box models such as the decision tree and SVM require a lot of training samples, but failure samples are often so few in practice that the models cannot achieve good effects. The deep neural network method that has been rapidly developed recently has made a great breakthrough in accuracy. However, this method is a black box model so it is not trusted by blast furnace operators and difficult to promote for use in practice due to its questionable credibility and diagnostic stability. Besides, the method based on multivariate statistics has a very high rate of false judgment for large-sized blast furnaces that are fluctuating in raw material quality and operating in complicated and changing environments. Therefore, there is still a great gap from methods for diagnosis of abnormal furnace conditions in the prior art to the practical application, so it is necessary to explore new ways and methods.

SUMMARY

To overcome shortcomings of the prior art, the present disclosure aims at providing a method for deriving fault diagnosis rules of a blast furnace based on a deep neural network. Firstly, the method adopts a deep neural network to model historical fault data of a blast furnace so as to ensure the high diagnosis precision of the model; then, for each kind of fault, expert fault diagnosis rules of the blast furnace are obtained from a hidden layer of the deep neural network by using a decision tree, thereby providing blast furnace operators with understandable, modifiable and referential rules of blast furnace fault diagnosis. The method provided in the present disclosure not only obtains fault diagnosis knowledge from the historical data of the blast furnace by utilizing the advantage of high diagnosis precision of the deep neural network, but also converts the knowledge into rules readily understandable to blast furnace operators, thereby greatly reducing the cost of system maintenance, improving the system dynamics, enabling the fusion of knowledge and decision-making about man-machine collaboration, and being widely applied to industrial systems requiring high confidence levels and accuracy for fault diagnosis.

A method for deriving fault diagnosis rules of a blast furnace based on a deep neural network, including:

Step 1: a weight training is performed on a deep neural network by utilizing historical fault data of a blast furnace, and a deep neural network model is established for the blast furnace fault diagnosis, namely learning, and expressing, blast furnace fault diagnosis knowledge from the historical fault data of the blast furnace the knowledge as an abstract nonlinear mapping from a blast furnace variable parameter to a blast furnace fault category;

Step 2: for each kind of fault, the process starts from a last layer of a hidden layer in the deep neural network, wherein a rule antecedent of the if-then rule in a rule subset formed by nodes in the current layer and the next layer is extracted, and duplicate items are removed to form a rule antecedent set;

Step 3: each element in the rule antecedent set is a combination of node conditions in the current layer, the decision tree is used to establish an input and output sub-model of the element and node conditions in a previous layer, and the decision tree formed in this way makes the nonlinear mapping (from blast furnace variable parameters to blast furnace fault categories) characterized by the deep neural network model into a more intuitive fault diagnosis model that is understandable to blast furnace operators, thus enabling good human-computer interaction;

Step 4: the decision tree sub-model is used to derive the if-then rule with the node condition in the previous layer being a rule antecedent and with the nodes in the current layer being the rule consequent, and the if-then rule is added into the rule subset of nodes in the previous layer and the current layer;

Step 5: Step 3 and Step 4 are repeated until all elements in the rule antecedent set are processed and a rule subset is formed for nodes in the previous layer and in the current layer;

Step 6: by setting the previous layer in Step 5 to the current layer, and setting the current layer in Step 5 to the next layer, Step 2, Step 3, Step 4 and Step 5 are repeated again and so on until reaching an input layer of the deep neural network, namely the input layer of the blast furnace process variable parameters;

Step 7: according to the sequence of formation of each rule subset, rules are searched in turn for matching the rule antecedents with the rule consequents in adjacent subsets, and are continuously linked to form new rules, so that an if-then rule with the blast furnace process variables as the rule antecedent and with the fault categories as the rule consequent can be obtained finally, and thus a fault diagnosis rule set of the blast furnace can be obtained finally.

The structure of the deep neural network in Step 1 is as follows: the depth neural network includes three parts: an input layer, a hidden layer and an output layer. The input layer is a layer for inputting blast furnace process variable parameters including air permeability index, cold air flow rate, hot air flow rate, top pressure, cold air pressure, hot air pressure, and other industrial process parameters characterizing the blast furnace production status. The output layer is a layer of the blast furnace fault categories, including tight furnace operation, hanging, pipeline, material slip, furnace heating, cooling, and other furnace faults related to the blast furnace production. The hidden layer functions to establish a nonlinear mapping from blast furnace process variables to blast furnace fault categories, so that a blast furnace fault diagnosis model can be established by learning the knowledge of blast furnace fault diagnosis from historical fault data of the blast furnace. Neurons in the same layer are not connected, but the neurons between layers are fully connected, wherein each connection has a weight value that characterizes the strength of connection between neurons. Different industrial application fields have different requirements for the number of hidden layers of the deep neural network. A neural network with more than or just 2 defined hidden layers is referred to as a deep neural network. The mathematical model of the deep neural network is as follows:

$$h_i^j = f\left(\sum_{l=1}^{z_{i-1}} W(i, j)h_{i-1}^l + b_i^j\right) \quad i = 1, \ldots, k; j = 1, \ldots, z_i \quad (1)$$

$$y = g\left(\sum_{l=1}^{z_k} W(i, j)h_k^l + b_{k+1}\right)$$

In the formula, $h_i^j$ is the output of the jth hidden layer cell in the ith layer of the neural network; when $h_i$ is labeled as the ith layer of the neural network, $h_0$ is the input layer of the neural network and $h_{k+1}$ is the output layer of the neural network; the value of j depends on the number of neurons in the ith layer of the network;

if the number of neurons in the ith layer is $z_i$, the value of j in each layer is from 1 to $z_i$; W(i, j) is a weight matrix corresponding to the jth neuron in the ith layer; $b_i^j$ is an offset item corresponding to the jth neuron in the ith layer, and $b_{k+1}$ is an offset item corresponding to the output layer cell; y represents the output of the neural network;

f(●) and g(●) are activation functions of the hidden layer cell and the output cell, respectively.

The steps of forming the decision tree in Step 3 are as follows: the rule subset formed by extracting nodes from the current layer and the next layer in Step 2 is labeled as $R_{h_j \to h_{j+1}}^v$, wherein v represents the blast furnace fault category, $h_j$ is the current layer, $h_{j+1}$ is the next layer and $h_{j-1}$ is the previous layer; the historical data samples of the blast furnace participating in the deep neural network training is labeled as $x_1, x_2, \ldots, x_m$, wherein each sample includes air permeability index, cold air flow rate, hot air flow rate, top pressure, cold air pressure, hot air pressure, and other industrial parameters characterizing the blast furnace production status, as well as corresponding categories of blast furnace faults, including tight furnace operation, hanging, pipeline, material slip, furnace heating and cooling; the extracted rule antecedent set is T, and for t∈T, the steps of forming the decision tree are as follows:

a. For the blast furnace fault training sample $x_1, x_2, \ldots, x_m$, calculating an activation function value of each neuron of each sample in the $h_{j-1}$ layer of the network layer, namely the output of neurons, which is labeled as $x_1^{j-1}, x_2^{j-1}, \ldots, x_m^{j-1}$;

b. For the blast furnace fault training sample $x_1, x_2, \ldots, x_m$, calculating an activation function value of each neuron of each sample in the $h_j$ layer of the network layer, namely the output of neurons, which is labeled as $x_1^j, x_2^j, \ldots, x_m^j$;

c. For $x_1^j, x_2^j, \ldots, x_m^j$, determining that whether it meets the condition of the rule antecedent t, and, if so, it is labeled as 1, otherwise 0, so as to obtain a binary output labeled as $y_1^j, y_2^j, \ldots, y_m^j$;

d. Combining $x_1^{j-1}, x_2^{j-1}, \ldots, x_m^{j-1}$ with $y_1^j, y_2^j, \ldots, y_m^j$ correspondingly into a data sample $(x_1^{j-1}, y_1^j), (x_1^{j-1}, y_1^j), \ldots, (x_m^{j-1}, y_1^j)$ for training the decision tree, wherein the decision tree is trained by a C4.5 algorithm, and the decision tree is recursively constructed by selecting features based on the criterion of maximum information gain rate at each node of the decision tree.

The steps of deriving the if-then rule by using the decision tree mentioned in Step 4 are as follows: the rule subset of nodes in the previous layer and in the current layer is labeled as $R_{h_{j-1} \to h_j}^v$, wherein after the decision tree is generated in Step 3, each leaf node is taken as a rule consequent in order to find all paths from the root node to respective leaf node; nodes and their respective conditions that each path passes through are recorded, wherein an "and" combination is used to form a rule antecedent so that each path reaching the leaf node may form a rule antecedent; an if-then rule are formed by combining the rule antecedent and the rule consequent correspondingly, and added into the rule subset, with each subset characterizing a part of the nonlinear mapping from blast furnace process variables to blast furnace fault categories contained in the deep neural network model of fault diagnosis, which is an expression understandable to blast furnace operators.

The step of finding the rule for matching the rule antecedent with the rule consequent in adjacent subsets and forming new rules by continuous linking in Step 7 are as follows: the current layer is labeled as $h_j$, the later layer as $h_{j+1}$, and the previous layer as $h_{j-1}$; the rule subset formed by nodes in the current layer and in the next layer is $R_{h_j \to h_{j+1}}^v$, and the rule subset formed by nodes in the previous layer and in the current layer node is $R_{h_{j-1} \to h_j}^v$; the initially formed rule subset $R_{h_k \to h_{k+1}}^v$ takes the blast furnace fault categories as the rule consequent, and the last formed rule subset $R_{h_0 \to h_1}^v$ takes the blast furnace variables as the rule antecedent; the rule antecedent of each rule is extracted from the rule subset $R_{h_j \to h_{j+1}}^v$, for comparison with the rule consequent of the rule in $R_{h_{j-1} \to h_j}^v$; if the rule antecedent is consistent with the rule consequent, the rules corresponding to $R_{h_j \to h_{j+1}}^v$ and $R_{h_{j-1} \to h_j}^v$ are changed into new rules taking the rule antecedent of the rules in $R_{h_{j-1} \to h_j}^v$ as the rule antecedent and taking the rule consequent of the rules in $R_{h_j \to h_{j+1}}^v$ as the rule consequent, which are then added into the new rule subset $R_{h_{j-1} \to h_j}^v$; it proceeds in this way until all rules in the rule subset $R_{h_{j-1} \to h_j}^v$ are processed and a new rule subset $R_{h_{j-1} \to h_{j+1}}^v$ is formed, so that after continuous linking performed in adjacent rule subsets, the if-then rule can be finally obtained which takes blast furnace process variables as rule antecedents and takes fault categories as rule consequents, and finally a fault diagnosis rule set $R_{h_0 \to h_{k+1}}^v$ of the blast furnace is obtained for the fault category v.

According to the present disclosure, the deep neural network method and the expert system method learn from each other, leverage the high-precision advantage of the deep neural network diagnosis, fully mine the knowledge contained in the data, and express the diagnosis principle through the if-then rule, thereby providing blast furnace operators with understandable, modifiable and referential rules of blast furnace fault diagnosis, and enhancing their confidence. Meanwhile, the expertise of blast furnace operators may be utilized to modify the automatically formed rules in line with the actual production requirements, so as to realize a new blast furnace operation mode of man-machine cooperation, realize the enhancement of man-machine mixing, and improve the automation and intelligence level of the iron-making process.

DETAILED DESCRIPTION OF THE EMBODIMENTS

Figure 1:
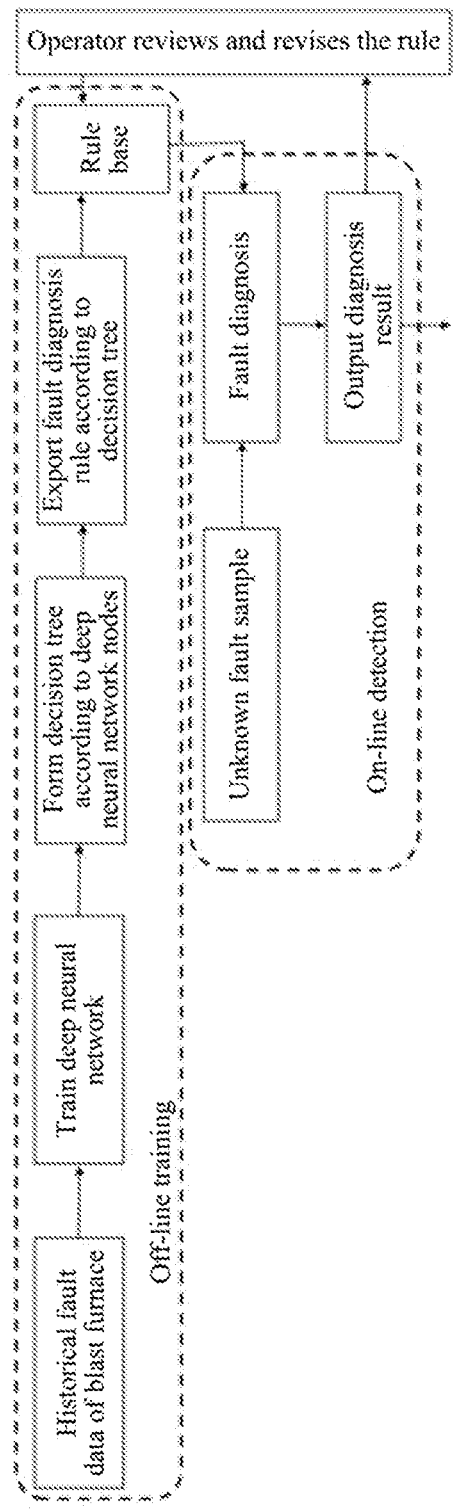
FIG. 1 is an flow block diagram of the method according to the present disclosure.

The present disclosure aims at providing a method for deriving fault diagnosis rules of a blast furnace based on a deep neural network, with the flow block diagram as shown in FIG. 1. Considering the vulnerability and incomplete information of the blast furnace system, in addition to using the advantage of high diagnosis precision of the deep neural network, the abstract knowledge represented by the deep neural network model is also converted into rules readily understandable to blast furnace operators, thereby greatly facilitating the blast furnace operators to understand, modify and reference the fault diagnosis rules of the blast furnace, and being very practical. The method can acquire, and convert, the knowledge from historical fault data of the blast furnace into a form understandable to operators, and realized knowledge and decision-making enhancement in blast furnace fault diagnosis through man-machine cooperation, thus ensuring the confidence levels and accuracy for blast furnace fault diagnosis. In the description below, the effectiveness of the method of the present disclosure is verified by the blast furnace fault data collected from a No. 2 blast furnace in a steel plant.

The blast furnace is divided into five parts from top to bottom: throat, shaft, bosh, belly and hearth. Cokes, ores and fluxes will go through different changes in different parts within the furnace during the settlement, until they reach the hearth bottom and are completely converted into molten iron and slag. Because of the huge volume of a blast furnace and complex chemical reactions within the furnace, it is extremely important to ensure its safe and stable operation. The blast furnace faults mainly consist of 4 categories: tight operation, hanging, pipeline, and material slip. Data collected during the production includes 29 parameters such as air permeability index, cold air flow rate, hot air flow rate, top pressure, cold air pressure, and hot air pressure. During the actual production, workers are organized by a three-shift duty system to monitor and operate the blast furnace iron-making process, which is costly in human resources, and the control model is relatively extensive which mainly relies on several parameters to determine the furnace condition, so it is difficult to timely diagnose the problems existing in the operation of the blast furnace and carry out accurate control. The method of the present disclosure can solve this problem to a certain extent, and has a usage value in practical application.

The implementation steps of the present disclosure are described in detail in combination with the specific process as below:

I Establishing a Deep Neural Network Model

Figure 2:
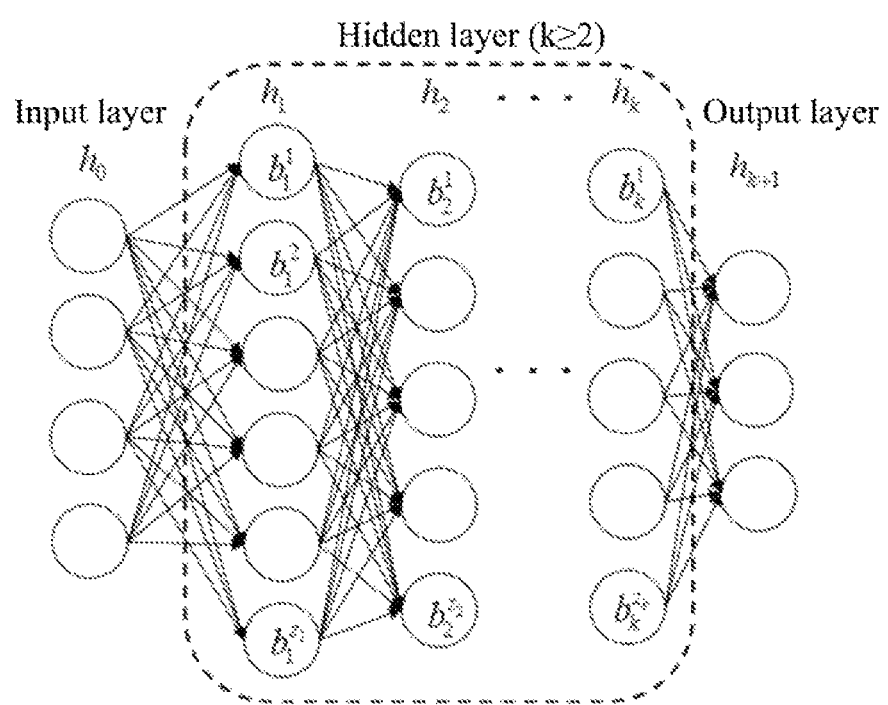
FIG. 2 is a structural schematic view of the deep neural network.

80% of samples are taken as training data of the neural network, and the remaining 20% are taken as data for verifying the validity of the finally derived rules. The training data is used to perform the weight training of the deep neural network and establish the deep neural network model of the fault diagnosis. The structure of the deep neural network is as shown in FIG. 2;

II Utilizing a Decision Tree to Export Fault Diagnosis Rules of Blast Furnace

When $h_i$ is labeled as the ith layer of the neural network, $h_0$ is the input layer of the neural network and $h_{k+1}$ is the output layer of the neural network; the input layer is a layer for inputting blast furnace process variable parameters including 29 industrial process parameters characterizing the blast furnace production status, such as air permeability index, cold air flow rate, hot air flow rate, top pressure, cold air pressure, and hot air pressure; the output layer is a layer of the blast furnace fault categories, including 4 kinds of furnace faults related to the blast furnace production, such as tight furnace operation, hanging, and pipeline; when $h_i^j$ is the output of the jth hidden layer cell in the ith layer of the neural network, if the number of neurons in the ith layer is $z_i$, the value of j in each layer is set to 1 to $z_i$; the rule subset formed by nodes in the current layer and in the next layer is $R_{h_j \to h_{j+1}}^v$, with v representing the fault category, $h_j$ is the current layer, $h_{j+1}$ is the next layer, and $h_{j-1}$ is the previous layer; the historical data samples of the blast furnace participating in the deep neural network training is labeled as $x_1, x_2, \ldots, x_m$, wherein each sample includes blast furnace process variables and corresponding blast furnace fault categories; the extracted rule antecedent set is T, and for $t \in T$, the steps of forming the decision tree are as follows:

(1) for each kind of fault v, the process starts from a final hidden layer in the deep neural network, wherein a rule antecedent of the if-then rule in a rule subset formed by nodes in the current layer and the next layer is extracted, and duplicate items are removed to form a rule antecedent set T;

(2) for $t \in T$, the steps of forming the decision tree are as follows:

a. For the blast furnace fault training sample $x_1, x_2, \ldots, x_m$, calculating an activation function value of each neuron of each sample in the $h_{j-1}$ layer of the network layer, namely the output of neurons, which is labeled as $x_1^{j-1}, x_2^{j-1}, \ldots, x_m^{j-1}$;

b. For the blast furnace fault training sample $x_1, x_2, \ldots, x_m$, calculating an activation function value of each neuron of each sample in the $h_j$ layer of the network layer, namely the output of neurons, which is labeled as c. For $x_1^j, x_2^j, \ldots, x_m^j$, determining that whether it meets the condition of the rule antecedent t, and, if so, it is labeled as 1, otherwise 0, so as to obtain a binary output labeled as $y_1^j, y_2^j, \ldots, y_m^j$;

d. Combining with $x_1^{j-1}, x_2^{j-1}, \ldots, x_m^{j-1}$ with $y_1^j, y_2^j, \ldots, y_m^j$ correspondingly into a data sample $(x_1^{j-1}, y_1^j), (x_2^{j-1}, y_2^j), \ldots, (x_m^{j-1}, y_m^j)$ for training the decision tree, wherein the decision tree is trained by a C4.5 algorithm, and the decision tree is recursively constructed by selecting features based on the criterion of maximum information gain rate at each node of the decision tree.

(3) The rule subset of nodes in the previous layer and in the current layer is labeled as $R_{hj_1 \to hj}^v$ wherein after the decision tree is generated in Step (2), each leaf node is taken as a rule consequent in order to find all paths from the root node to respective leaf node; nodes and their respective conditions that each path passes through are recorded, wherein an "and" combination is used to form a rule antecedent so that each path reaching the leaf node may form a rule antecedent; an if-then rule are formed by combining the rule antecedent and the rule consequent correspondingly, and added into the rule subset.

(4) Step (2) and Step (3) are repeated until all elements in the rule antecedent set are processed and a rule subset $R_{h_{j-1} \to h_j}^v$ is formed by nodes in the previous layer and in the current layer;

(5) By setting the previous layer in Step (4) to the current layer, and setting the current layer in Step (4) to the next layer, Step (1), Step (2), Step (3) and Step (4) are repeated again and so on until reaching an input layer of the deep neural network, namely the input layer of the blast furnace process variable parameters;

(6) According to the sequence of formation of each rule subset, rules are searched in turn for matching the rule antecedents with the rule consequents in adjacent subsets, wherein the current layer is labeled as $h_j$, the later layer as $h_{j+1}$, and the previous layer as $h_{j-1}$; the rule subset formed by nodes in the current layer and in the next layer is $R_{h_j \to h_{j+1}}^v$, and the rule subset formed by nodes in the previous layer and in the current layer node is $R_{h_{j-1} \to h_j}^v$; the initially formed rule subset $R_{h_k \to h_{k+1}}^v$ takes the blast furnace fault categories as the rule consequent, and the last formed rule subset $R_{h_0 \to h_1}^v$ takes the blast furnace process variables as the rule antecedent; the rule antecedent of each rule is extracted from the rule subset $R_{h_j \to h_{j+1}}^v$ for comparison with the rule consequent of the rule in $R_{h_{j-1} \to h_j}^v$; if the rule antecedent is consistent with the rule consequent, the rules corresponding to $R_{h_j \to h_{j+1}}^v$ and $R_{h_{j-1} \to h_j}^v$ are changed into new rules taking the rule antecedent of the rules in $R_{h_{j-1} \to h_j}^v$ as the rule antecedent and taking the rule consequent of the rules in $R_{h_j \to h_{j+1}}^v$ as the rule consequent, which are then added into the new rule subset $R_{h_{j-1} \to h_{j+1}}^v$; it proceeds in this way until all rules in the rule subset $R_{h_j \to h_{j+1}}^v$ are processed and a new rule subset $R_{h_{j-1} \to h_{j+1}}^v$ is formed, so that after continuous linking performed in adjacent rule subsets, the if-then rule can be finally obtained which takes blast furnace process variables as rule antecedents and takes fault categories as rule consequents, and finally a fault diagnosis rule set $R_{h_0 \to h_{k+1}}^v$ of the blast furnace is obtained for the fault category v.

III Substituting Industrial Actual Data for Verification

We take the fault data from January 2018 to December 2019 of the No. 2 blast furnace with a capacity of 2650 m³ in an iron-making plant as samples, which contain 29 parameters and are sampled at the same sampling rate. The deep neural network training is perform on 80% of data for extracting rules, and the remaining 20% are used to verify the validity of expert rules.

Figure 3:
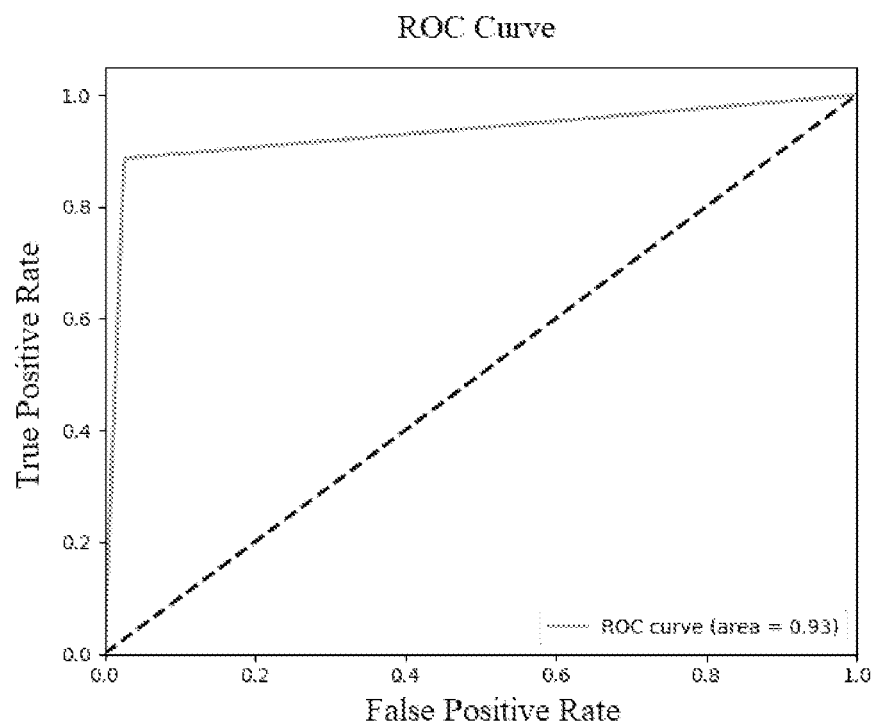
FIG. 3 is an AUC curve of prediction effects of blast furnace faults by the method according to the present disclosure.

As shown in FIG. 3, it is an AUC curve of prediction effects of blast furnace faults by the method according to the present disclosure. It can be seen from the fault diagnosis result that the model shows a good effect. The true positive rate of classification accuracy reaches 93%, and the false positive rate keeps low, which indicates that the blast furnace fault samples can be accurately classified, so this method can be applied to actual industrial production.

What is claimed is:

1. A method for deriving fault diagnosis rules of a blast furnace based on a deep neural network, comprising:

Step 1: a weight training is performed on a deep neural network by utilizing historical fault data of a blast furnace, and a deep neural network model is established for the blast furnace fault diagnosis, namely learning, and expressing, blast furnace fault diagnosis knowledge from the historical fault data of the blast furnace the knowledge as an abstract nonlinear mapping from a blast furnace process variable to a blast furnace fault category;

Step 2: for each kind of fault, the process starts from a last layer of a hidden layer in the deep neural network, wherein a rule antecedent of the if-then rule in a rule subset formed by nodes in the current layer and the next layer is extracted, and duplicate items are removed to form a rule antecedent set;

Step 3: each element in the rule antecedent set is a combination of node conditions in the current layer, a decision tree is used to establish an input and output sub-model of the element and nodes in a previous layer, and the decision tree formed in this way makes the nonlinear mapping, from blast furnace process variables to blast furnace fault categories, characterized by the deep neural network model into an intuitive fault diagnosis model, thus enabling human-computer interaction;

Step 4: the decision tree sub-model is used to derive the if-then rule with the node condition in the previous layer being a rule antecedent and with the nodes in the current layer being the rule consequent, and the if-then rule is added into the rule subset of nodes in the previous layer and the current layer;

Step 5: Step 3 and Step 4 are repeated until all elements in the rule antecedent set are processed and a rule subset is formed for nodes in the previous layer and in the current layer;

Step 6: by setting the previous layer in Step 5 to the current layer, and setting the current layer in Step 5 to the next layer, Step 2, Step 3, Step 4 and Step 5 are repeated again and so on until reaching an input layer of the deep neural network, namely the input layer of the blast furnace process variable parameters;

Step 7: according to the sequence of formation of each rule subset, rules are searched in turn for matching the rule antecedents with the rule consequents in adjacent subsets, and are continuously linked to form new rules, so that a if-then rule with the blast furnace process variables as the rule antecedent and with the fault categories as the rule consequent can be obtained finally, and thus a fault diagnosis rule set of the blast furnace can be obtained finally.

2. The method according to claim 1, wherein the structure of the deep neural network in Step 1 is as follows:

the deep neural network includes three parts: an input layer, a hidden layer and an output layer; the input layer is a layer for inputting blast furnace process variable parameters including air permeability index, cold air flow rate, hot air flow rate, top pressure, cold air pressure, hot air pressure, and other industrial process parameters characterizing the blast furnace production status; the output layer is a layer of the blast furnace fault categories, including tight furnace operation, hanging, pipeline, material slip, furnace heating, cooling, and other furnace faults related to the blast furnace production; the hidden layer functions to establish a nonlinear mapping from blast furnace process variables to blast furnace fault categories, and a blast furnace fault diagnosis model can be established by learning the knowledge of blast furnace fault diagnosis from historical fault data of the blast furnace; neurons in the same layer are not connected, but the neurons between layers are fully connected, wherein each connection has a weight value that characterizes the strength of connection between neurons; a mathematical model of deep neural network is:

$$h_i^j = f\left(\sum_{l=1}^{z_{i-1}} W(i,j) h_{i-1}^l + b_i^j\right) \quad i=1,\ldots,k; j=1,\ldots,z_i \quad (1)$$

$$y = g\left(\sum_{l=1}^{z_k} W(i,j) h_k^l + b_{k+1}\right)$$

in the formula, $h_i^j$ is the output of the jth hidden layer cell in the ith layer of the neural network; when $h_i$ is labeled as the ith layer of the neural network, $h_o$ is the input layer of the neural network and $h_{k+1}$ is the output layer of the neural network; the value of j depends on the number of neurons in the ith layer of the network; if the number of neurons in the ith layer is $z_i$, the value of j in each layer is from 1 to $z_i$;

W(i, J) is a weight matrix corresponding to the jth neuron in the ith layer; $b_i^j$ is an offset item corresponding to the jth neuron in the ith layer, and $b_{k+1}$ is an offset item corresponding to the output layer cell; y represents the output of the neural network;

f(●) and g(●) are activation functions of the hidden layer cell and the output cell, respectively.

3. The method according to claim 1, wherein the steps of forming the decision tree in Step 3 are as follows: the rule subset formed by extracting nodes from the current layer and the next layer in Step 2 is labeled as $R_{h_j \to h_{j+1}}^v$, wherein v represents the blast furnace fault category, $h_j$ is the current layer, $h_{j+1}$ is the next layer and $h_{j-1}$ is the previous layer; the historical data samples of the blast furnace participating in the deep neural network training is labeled as $x_1, x_2, \ldots, x_m$, wherein each sample includes air permeability index, cold air flow rate, hot air flow rate, top pressure, cold air pressure, hot air pressure, and other industrial parameters characterizing the blast furnace production status, as well as corresponding categories of blast furnace faults, including tight furnace operation, hanging, pipeline, material slip, furnace heating and cooling; the extracted rule antecedent set is T, and for t∈T, the steps of forming the decision tree are as follows:

a. For the blast furnace fault training sample $x_1, x_2, \ldots, x_m$, calculating an activation function value of each neuron of each sample in the $h_{j-1}$ layer of the network layer, namely the output of neurons, which is labeled as $x_1^{j-1}, x_2^{j-1}, \ldots, x_m^{j-1}$;

b. For the blast furnace fault training sample $x_1, x_2, \ldots, x_m$, calculating an activation function value of each neuron of each sample in the $h_j$ layer of the network layer, namely the output of neurons, which is labeled as $x_1^j, x_2^j, \ldots, x_m^j$;

c. For $x_1^j, x_2^j, \ldots, x_m^j$, determining that whether it meets the condition of the rule antecedent t, and, if so, it is labeled as 1, otherwise 0, so as to obtain a binary output labeled as $y_1^j, y_2^j, \ldots, y_m^j$;

d. Combining $x_1^{j-1}, x_2^{j-1}, \ldots, x_m^{j-1}$ with $y_1^j, y_2^j, \ldots, y_m^j$ correspondingly into a data sample $(x_1^{j-1}, y_1^j), (x_1^{j-1}, y_1^j), \ldots, (x_m^{j-1}, y_1^j)$ for training the decision tree, wherein the decision tree is trained by a C4.5 algorithm, and the decision tree is recursively constructed by selecting features based on the criterion of maximum information gain rate at each node of the decision tree.

4. The method according to claim 1, wherein steps of deriving the if-then rule by using the decision tree mentioned in Step 4 are as follows: the rule subset of nodes in the previous layer and in the current layer is labeled as $R_{h_{j-1} \to h_j}^v$, wherein after the decision tree is generated in Step 3, each leaf node is taken as a rule consequent in order to find all paths from the root node to respective leaf node; nodes and their respective conditions that each path passes through are recorded, wherein an "and" combination is used to form a rule antecedent so that each path reaching the leaf node may form a rule antecedent; an if-then rule are formed by combining the rule antecedent and the rule consequent correspondingly, and added into the rule subset, with each subset characterizing a part of the nonlinear mapping from blast furnace process variables to blast furnace fault categories contained in the deep neural network model of fault diagnosis, which is an expression understandable to blast furnace operators.

5. The method according to claim 1, wherein the steps of finding the rule for matching the rule antecedent with the rule consequent in adjacent subsets and forming new rules by continuous linking are as follows: the current layer is labeled as $h_j$, the later layer as $h_{j+1}$, and the previous layer as $h_{j-1}$; the rule subset formed by nodes in the current layer and in the next layer is $R_{h_j \to h_{j+1}}^v$, and the rule subset formed by nodes in the previous layer and in the current layer node is $R_{h_{j-1} \to h_j}^v$; the initially formed rule subset $R_{h_k \to h_{k+1}}^v$ takes the blast furnace fault categories as the rule consequent, and the last formed rule subset $R_{h_0 \to h_1}^v$ takes the blast furnace process variables as the rule antecedent; the rule antecedent of each rule is extracted from the rule subset $R_{h_j \to h_{j+1}}^v$, for comparison with the rule consequent of the rule in $R_{h_{j-1} \to h_j}^v$; if the rule antecedent is consistent with the rule consequent, the rules corresponding to $R_{h_j \to h_{j+1}}^v$ and $R_{h_{j-1} \to h_j}^v$ are changed into new rules taking the rule antecedent of the rules in $R_{h_{j-1} \to h_j}^v$ as the rule antecedent and taking the rule consequent of the rules in $R_{h_j \to h_{j+1}}^v$ as the rule consequent, which are then added into the new rule subset $R_{h_{j-1} \to h_j}^v$; it proceeds in this way until all rules in the rule subset $R_{h_j \to h_{j+1}}^v$ are processed and a new rule subset $R_{h_{j-1} \to h_{j+1}}^v$ is formed, so that after continuous linking performed in adjacent rule subsets, the if-then rule can be finally obtained which takes blast furnace process variables as rule antecedents and takes fault categories as rule consequents, and finally a fault diagnosis rule set $R_{h_0 \to h_{k+1}}^v$ of the blast furnace is obtained for the fault category v.

\* \* \* \* \*